(12) United States Patent
Estes et al.

(10) Patent No.: US 6,215,930 B1
(45) Date of Patent: Apr. 10, 2001

(54) REMOTE-SPLITTER FIBER OPTIC CABLE

(75) Inventors: Daniel L. Estes, Lawrenceville; David P. Swanson; David W. Levenson, both of Duluth, all of GA (US)

(73) Assignee: Bellsouth Intellectual Property Management Corporation, Atlanta, GA (US)

( * ) Notice: Subject to any disclaimer, the term of this patent is extended or adjusted under 35 U.S.C. 154(b) by 0 days.

(21) Appl. No.: 09/075,721

(22) Filed: May 11, 1998

(51) Int. Cl.[7] ....................................... G02B 6/44

(52) U.S. Cl. .................. 385/100; 385/109; 385/112

(58) Field of Search ...................... 385/100–113, 95–99, 385/48

(56) References Cited

U.S. PATENT DOCUMENTS

| | | | |
|---|---|---|---|
| 4,961,623 | * 10/1990 | Midkiff et al. ......................... | 385/95 |
| 5,071,214 | * 12/1991 | Jacob et al. ............................ | 385/12 |
| 5,410,343 | 4/1995 | Coddington et al. ................... | 348/7 |
| 5,440,665 | 8/1995 | Ray et al. ............................. | 385/135 |
| 5,479,202 | 12/1995 | Beriont ................................. | 348/7 |
| 5,488,413 | 1/1996 | Elder et al. ........................... | 348/13 |
| 5,528,582 | 6/1996 | Bodeep et al. ........................ | 370/24 |
| 5,541,757 | 7/1996 | Fuse et al. ............................ | 359/125 |
| 5,550,579 | 8/1996 | Martinez .............................. | 348/12 |
| 5,557,316 | 9/1996 | Hoarty et al. .......................... | 348/7 |
| 5,606,725 | 2/1997 | Hart ..................................... | 455/5.1 |
| 5,615,246 | 3/1997 | Beveridge ............................. | 379/56 |
| 5,630,204 | 5/1997 | Hylton et al. ......................... | 455/3.3 |
| 5,631,903 | 5/1997 | Dianda et al. ........................ | 370/401 |
| 5,642,155 | 6/1997 | Cheng ................................... | 348/12 |
| 5,659,351 | 8/1997 | Huber ................................... | 348/7 |
| 5,684,799 | 11/1997 | Bigham et al. ........................ | 370/397 |
| 5,719,872 | 2/1998 | Dubberly et al. ..................... | 370/487 |

FOREIGN PATENT DOCUMENTS

| | | |
|---|---|---|
| 3706677 | 9/1988 | (DE) . |
| 4435767A1 | 10/1994 | (DE) . |
| 0509299 | 10/1992 | (EP) . |
| 2161614 | 1/1986 | (GB) . |
| WO 94/16534 | 7/1994 | (WO) . |
| WO 94/24597 | 10/1994 | (WO) . |

OTHER PUBLICATIONS

International Search Report, US99/10253, No Pub. Date Avail.
Claire et al., "Expanding Communication Services to the Local Subscriber," *IEEE*, pp. 2451–2458, (Jun.).
Brose, "Fiber–to–the–Home: East Otter Tail Phone Company Builds for the Future," *World Wide Web*, Oct. 1996, 23 pages.
Byte, "A Hybrid Fiber–Coaxial Network," *World Wide Web*, (no date), 2 pages.
Corning, "The Cabling Cost Curve Turns Toward Fiber," *World Wide Web*, Nov. 1993, 4 pages.
Hewlett Packard, "Architectures for building the broadband distribution network," *World Wide Web*, Aug. 1995, 2 pages.

\* cited by examiner

*Primary Examiner*—Brian Healy
*Assistant Examiner*—Michael J. Stahl
(74) *Attorney, Agent, or Firm*—Kilpatrick Stockton LLP

(57) ABSTRACT

A fiber optic cable having a plurality of buffer tubes. Within at least one of the buffer tubes is a plurality of main fibers. Within the cable outer sheath, the main fibers are factory-spliced with optical splitters at predetermined distances. Distribution fibers are factory-spliced to the outputs of the optical splitters. The distribution fibers reside within distribution buffer tubes, and are available for access at substantially any location along the length of the fiber optic cable. A certain number of the distribution fibers from a particular optical splitter extend in an upstream direction of the fiber cable, and the remaining distribution fibers from that optical splitter extend in a downstream direction.

10 Claims, 3 Drawing Sheets

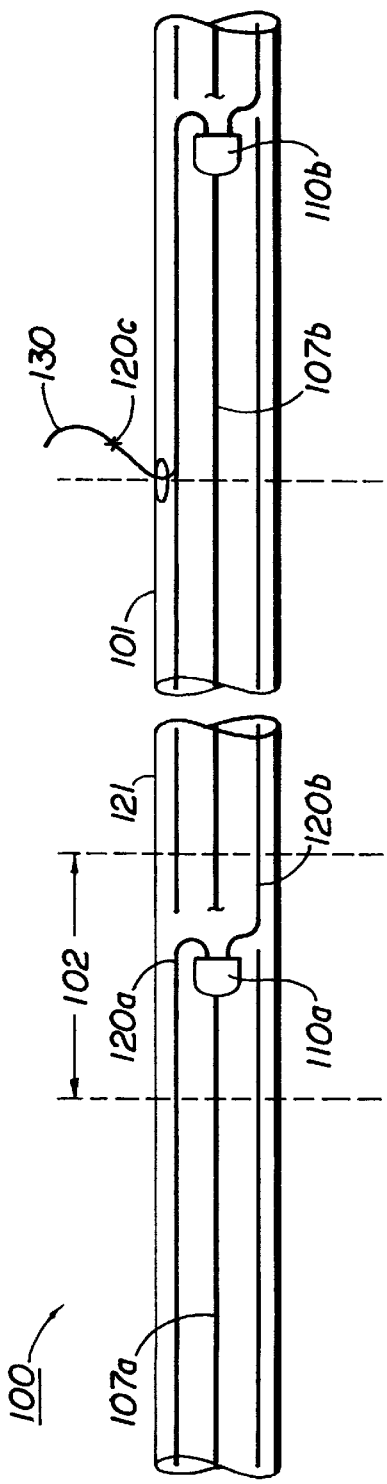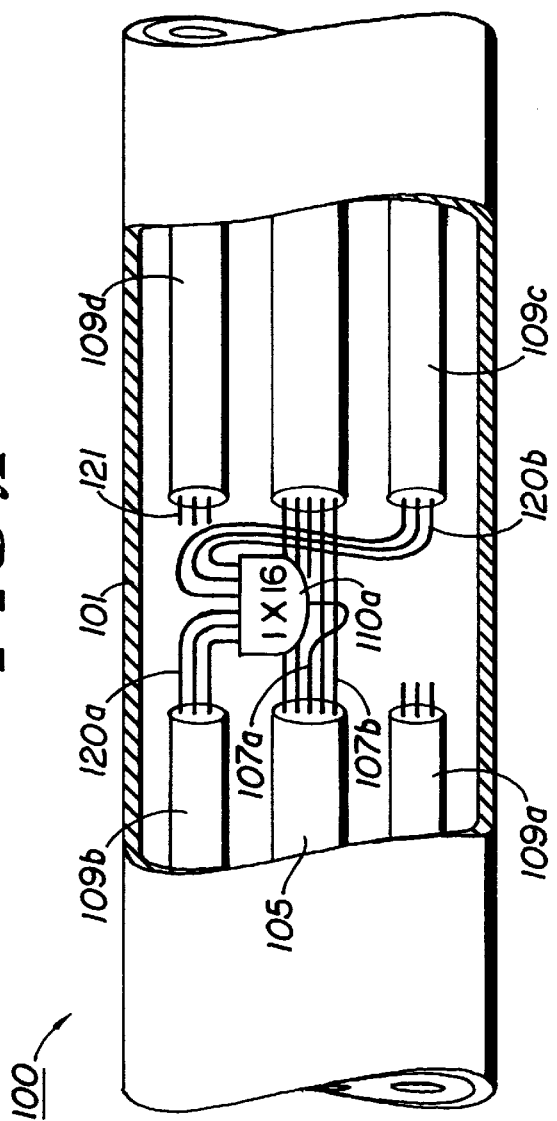

REMOTE-SPLITTER FIBER OPTIC CABLE

TECHNICAL FIELD

The present invention generally relates to data transmission media. More particularly, the present invention relates to factory-spliced fiber optic cables having distribution fibers accessible over substantially the entire length of the fiber cable.

BACKGROUND OF THE INVENTION

Recent advances in technology and the loosening of federal regulations have blurred the once-distinct lines between cable television (CATV) and telephony service. Currently, there is a great demand for a distribution infrastructure that will support the demanding throughput requirements of an integrated CATV and telephony network. The explosion of the Internet and the growing desire for individuals to enjoy interactive television are creating communication throughput demands that the existing copper-cable infrastructure simply cannot satisfy.

Fiber optics as a transmission medium promises a significant increase in information throughput to meet the needs of the telecommunications industries. Existing "fiber deep" distribution systems typically provide optical fiber to the serving area, with coaxial cable or twisted pair copper lines from the serving area to the subscriber's home. The information-transmitting capacity of fiber optics is 10 to 100 times higher than that of conventional copper-conductor communications cable. Consequently, there is a strong desire in both the CATV and the telephony industries to push optical fiber as deeply as possible into subscriber communities and neighborhoods.

Unfortunately, the cost of using fiber optics is typically much greater than copper-conductor cable. The high manufacturing, installation, and maintenance costs of fiber cable have created an economic barrier to providing fiber cable to a subscriber's home. For instance, with existing fiber cable, splice cases are located at discrete locations, called "splice points," along the length of the fiber cable. A drop fiber must be pulled from a splice case and spliced to a main fiber with an optical splitter. The drop fiber cannot be pulled from the cable at any other point along the length of the fiber cable. Currently, the drop fiber must typically be spliced to the main fiber in the field by a field technician. The field technician is likely to encounter environmental hazards, such as weather or debris, which can result in poor-quality splices. Moreover, preparing the main fiber to be spliced, and actually performing the splice, are very time-consuming and difficult tasks to perform in the field.

Field splicing the fiber cable is a difficult task which increases the cost of installing the fiber cable. Also, having a large number of drop fibers emanate from a single location on the fiber cable makes maintaining the fiber drops difficult for a field technician. There is a strong desire to decrease the costs of using fiber cable to make a Fiber-To-The-Home (Fri) distribution system realizable. A cost-effective fiber optic cable to enable FTTH service has eluded those skilled in the art. Therefore, a need exists for a remote-splitter fiber optic cable that alleviates the problems identified above.

SUMMARY OF THE INVENTION

Generally stated, a fiber optic cable according to the present invention has, within the fiber cable outer sheath, distribution fibers spliced to an optical splitter fed by a main fiber. The distribution fibers lie within a distribution buffer tube and are accessible at substantially any point along a length of the fiber cable. In particular, a subset of the distribution fibers extend downstream from the optical splitter, while the remaining distribution fibers extend in the upstream direction from the optical splitter.

More particularly, a fiber optic cable according to the present invention has a plurality of buffer tubes, including at least a main buffer tube and a distribution buffer tube, within the cable outer sheath. Within the main buffer tube are multiple main fibers. A main fiber is terminated at an optical splitter, and distribution fibers are spliced to the outputs of the optical splitter. A subset of the distribution fibers extends in the downstream direction of the fiber cable in one distribution buffer tube, and another subset of the distribution fibers from the optical splitter extends in the upstream direction of the fiber cable in another distribution buffer tube.

The foregoing configuration, i.e. an optical splitter having distribution fibers extending in both the upstream and downstream directions, is repeated throughout the fiber cable at a predetermined spacing. At each point along the entire length of the resulting fiber optic cable, rather than only at discrete splice points as with existing cables, at least one distribution fiber is accessible. In one embodiment, at a point along the fiber cable, two groups of distribution fibers are accessible. A first group of the accessible distribution fibers is fed by a first main fiber spliced to a first optical splitter. The other group of accessible distribution fibers is fed from a second main fiber spliced to a second optical splitter. Accordingly, at any point along the fiber cable, a service technician can connect a subscriber to one of at least two available transmitters.

In one embodiment, the optical splitters are factory-installed, which results in a splice of improved quality relative to field-spliced splitters, and significantly reduces the installation time and effort. These benefits, as well as other benefits derived from the present invention, result in a fiber optic cable which reduces the overall cost of providing a fiber optic telecommunications network. By reducing the installation and maintenance costs associated with installing fiber optic cable, the present invention makes a cost effective FTTH distribution infrastructure more easily realizable.

Accordingly, it is an object of the present invention to provide an improved fiber optic cable.

It is another object of the present invention to provide a cost effective fiber optic cable which can make a FTTH telecommunications distribution medium realizable.

It is a further object of the present invention to provide a fiber optic cable having factory-installed optical splitters within the cable sheath, pre-spliced to a feeder portion and a distribution portion of the fiber cable.

The various aspects of the present invention may be more clearly understood and appreciated from a review of the following detailed description of the disclosed embodiments, with reference to the appended drawings and claims.

BRIEF DESCRIPTION OF THE DRAWINGS

FIG. 1 is a cut-away illustration of a length of a fiber optic cable according to a preferred embodiment of the present invention.

FIG. 2 is a cut-away somewhat schematic illustration of the fiber optic cable of FIG. 1, detailing an optical splitter location.

DETAILED DESCRIPTION OF PREFERRED EMBODIMENTS

Figure 3A:
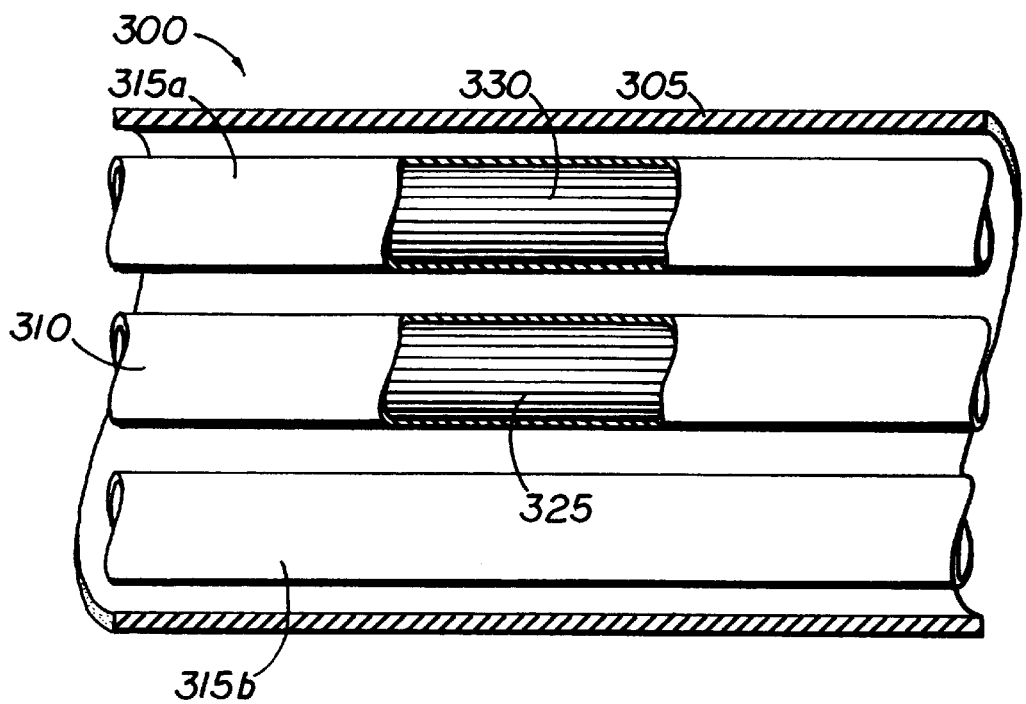
FIGS. 3A–3D illustrate an exemplary manufacturing process to achieve a fiber cable in accordance with the present invention.

FIG. 1 and FIG. 2 illustrate a fiber optic cable 100 constructed according to a preferred embodiment of the present invention. FIG. 1 is a cut-away view of a length of the fiber cable 100, and FIG. 2 is a cut-away view of the fiber cable 100 at optical splitter location 102, detailing optical splitter 110a. For this discussion, the "upstream end" is the end of the fiber cable 100 to be connected to a service provider or other optical signal transmitter. The "downstream end" is the terminal end of the fiber cable 100. The "upstream direction" is the direction along the length of cable from the subscriber area back toward the service provider, i.e. a CATV head-end. The "downstream direction" is the opposite direction, or from the service provider to the subscriber area.

FIG. 1 depicts main fibers 107a, 107b beginning at the upstream end of the fiber cable 100 and extending the length of the fiber cable 100 until terminated at an optical splitter, such as optical splitters 110a, 110b, respectively. The outer sheath 101 of the cable 100 provides the support necessary for fiber optic cabling. Within the outer sheath 101 and extending the length of the fiber cable 100 is a main buffer tube 105 (FIG. 2). The main fibers 107a, 107b reside within the main buffer tube 105 (FIG. 2). Those skilled in the art will appreciate that as many main fibers as are necessary to service a subscriber area may reside within the main buffer tube 105. Existing fiber cables often have multiple buffer tubes, each carrying a group of main fibers. The buffer tubes may be individually color-coded to enable identifying each group of main fibers. Being able to identify the main fibers is necessary to isolate a particular transmission path from the service provider or CATV head-end to a subscriber. However, for the purpose of clarity only, this discussion of a preferred embodiment is limited to a single main buffer tube 105 housing main fibers 107a, 107b. The main buffer tube 105 and the main fibers 107a, 107b within may be referred to as a "feeder portion."

Also within the cable outer sheath 101 are multiple distribution buffer tubes 109a–109d (FIG. 2). Each distribution buffer tube extends the length of the fiber cable 100 between two adjacent optical splitters, such as between optical splitter 110a and optical splitter 110b (FIG. 1). There may be two or more distribution buffer tubes extending between a pair of adjacent optical splitters. For instance, distribution buffer tube 109c (FIG. 2) and distribution buffer tube 109d both span the length of fiber cable 100 between optical splitter 110a and optical splitter 110b. Likewise, distribution buffer tube 109a and distribution buffer tube 109b both span the length of fiber cable 100 between optical splitter 110a and the next adjacent upstream optical splitter (not shown).

Main fiber 107a is terminated at the optical splitter 110a, one of multiple optical splitters 110a, 110b,. . . spaced apart along the length of the fiber cable 100, at splitter location 102. The optical splitter 110a may be spliced to the main fiber 107a during manufacturing. Any industry-standard method of terminating the main fiber 107a at the optical splitter 10a is acceptable, such as fusion splicing. The remaining main fibers, such as main fiber 107b, continue downstream within the main buffer tube 105 (FIG. 2).

The outputs of optical splitter 110a are spliced to a number of distribution fibers, such as distribution fibers 120a, 120b. The distribution fibers reside within and are coextensive with the distribution buffer tubes. Because a 1×16 optical splitter is used in the disclosed embodiment, 16 distribution fibers are spliced to the individual outputs of optical splitter 110a. In the disclosed embodiment, eight of the distribution fibers spliced to the outputs of optical splitter 110a extend in the upstream direction within distribution buffer tube 109b (FIG. 2). The remaining eight distribution fibers spliced to the outputs of optical splitter 110a extend in the downstream direction within distribution buffer tube 109c (FIG. 2).

Distribution buffer tube 109d, which spans the length of fiber cable 100 between optical splitter 110a and optical splitter 110b, contains upstream distribution fibers, such as distribution fiber 121, associated with optical splitter 110b, which is the next adjacent downstream optical splitter. Those skilled in the art will appreciate that all the distribution fibers spliced to optical splitter 110a can also reside within the same buffer tube without departing from the spirit of the present invention. The upstream distribution buffer tube 109b, the downstream distribution buffer tube 109c, and the distribution fibers within those buffer tubes are collectively referred to as a "distribution portion" corresponding to optical splitter 110a.

The distance between each optical splitter 110a–110b depends on the size of the optical splitters, and the number of subscribers that will be serviced by each optical splitter. The number of subscribers serviced by an optical splitter may be equal to the number of distribution fibers fed by the optical splitter. For instance, a 1×16 splitter could service sixteen subscribers, so the distance between optical splitters would correspond to the approximate distance spanned by sixteen subscribers. If sixteen subscribers span approximately 1000 linear feet of fiber cable 100 in a typical populated area, then a 1×16 optical splitter 110a would be sufficient to service the sixteen subscribers and allow approximately 1000 linear feet between optical splitters 110a–110b. Accordingly, the distance between the optical splitters 110a–110b can be increased if 1×32 splitters are employed. Although the exemplary embodiment makes use of a 1×16 optical splitter 110a, the size of the optical splitter 110a is dependent on the particular application. It is envisioned that fiber cables of varying configurations will be manufactured based on the needs of particular service providers.

The resultant fiber cable 100 of the disclosed embodiment provides access to sixteen distribution fibers at any location along the length of the fiber cable 100. For instance, at a location 115 along the length of the fiber cable 100, there are eight distribution fibers, such as distribution fiber 120c emanating from optical splitter 110b, within the upstream distribution tube 109d (FIG. 2). There are also eight distribution fibers, such as distribution fiber 120b emanating from optical splitter 1 10a, in the downstream distribution tube 109c (FIG. 2). It will be appreciated that the fiber cable 100 provides access to distribution fibers from at least two separate main fibers along the length. Consequently, the fiber cable 100 creates the ability to service a particular subscriber from at least two separate interface splice locations.

To connect a subscriber, a field technician penetrates the outer sheath 101 and one of the available distribution buffer tubes, such as distribution buffer tube 109d, at a convenient location, such as location 115. Once the outer sheath 101 and the distribution buffer tube 109d are penetrated, the field technician extracts a selected distribution fiber, such as distribution fiber 120c, from the distribution buffer tube 109*d*. As noted, the selected distribution fiber 120*c* emanates from optical splitter 110*b*.

Once the distribution fiber 120*c* has been withdrawn from the cable outer sheath 101, the field technician seals the penetration to prevent the cable 100 from being damaged by water infiltration and the like. The method of sealing the cable outer sheath 101 can be any industry-acceptable method, as will be obvious to those skilled in the art. The selected distribution fiber 120*c* is then spliced to a drop fiber 130, which is in turn placed to the subscriber's location and connected to the subscriber's premises equipment. Those skilled in the art will appreciate that the drop fiber 130 can be connected to the subscriber's premises equipment using any industry-acceptable method, including connectors or splices.

The field technician can also access any of the other distribution fibers available at location 115. For instance, if a particular subscriber serviced by the distribution fiber 120*c* creates an excessive burden on the bandwidth associated with optical splitter 110*b*, the field service technician can reallocate that subscriber to one of the distribution fibers in the downstream distribution buffer tube 109*c* (FIG. 2), such as distribution fiber 120*b* emanating from optical splitter 110*a*. To do so, the field service technician may disconnect the drop fiber 130 from the distribution fiber 120*c* and reconnect the drop fiber 130 to a distribution fiber within distribution buffer tube 109*c*, such as distribution fiber 120*b*. In this way, the burden of the subscriber is shifted to optical splitter 110*a* fed by main fiber 107*a*. As a result, the exemplary embodiment makes available an FTTH distribution medium with the ability to redistribute resources m accordance with subscribers' needs.

The "remote-splitter" fiber cable 100 of the present invention can be more cost-effectively fabricated than the current practice of field-splicing optical splitters into an existing fiber cable. A manufacturer can pre-assemble the fiber cable 100 with a main buffer tube 105, and as many distribution buffer tubes as desired for a particular application. The number of distribution fibers resident in each distribution buffer tube is dependent on the size of the optical splitter employed.

FIGS. 3A–3D illustrate an example of a procedure for manufacturing a fiber cable 100 (FIG. 1) in accordance with the present invention. While the disclosed procedure produces a fiber cable constructed in accordance with the present invention, those skilled in the art will understand that there may be other methods for producing such cables. In FIG. 3A, the procedure begins with a substantially conventional fiber optic cable 300 having an outer sheath 305 and a plurality of buffer tubes within the outer sheath 305. The length of the fiber cable 300 is predetermined based on the number of optical splitters which will be installed, the size of the optical splitters, and the number of drops which will emanate from the fiber cable 300.

In the disclosed embodiment, there are a main buffer tube 310, a first distribution buffer tube 315*a*, and a second distribution buffer tube 315*b*. The buffer tubes extend longitudinally within the outer sheath 305 for the length of the cable 300. Within the main buffer tube 310 is at least one main fiber 325 extending the length of the fiber cable 300. Within the distribution buffer tubes 315*a*, 315*b* are distribution fibers 330. The number of distribution fibers in each distribution buffer tube 315*a*, 315*b* depends on the size of the optical splitters 340 (FIG. 3B) used.

Figure 3B:
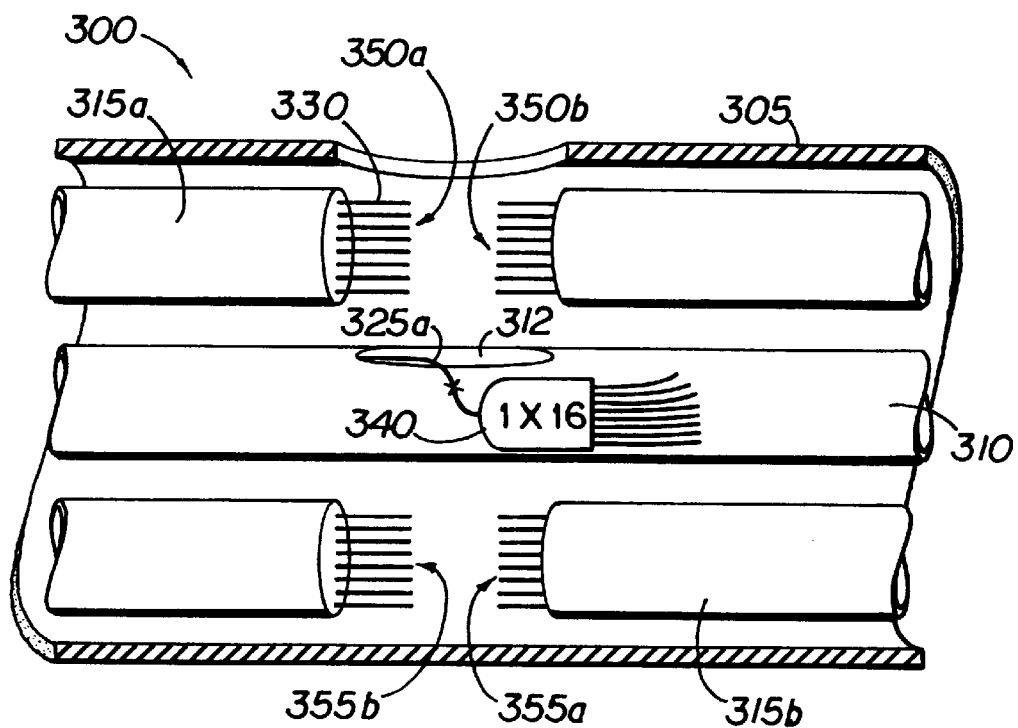

Turning to FIG. 3B, at predetermined locations along the length of the fiber cable 300, the outer sheath 305 is penetrated for access to the buffer tubes within. A longitudinal slot 312 is cut in the main buffer tube 310 for access to the main fibers 325 (FIG. 3A) within. A single main fiber 325*a* is withdrawn from the main buffer tube 310 and severed. A severed end of the main fiber 325*a* is fusion spliced to the input of an optical splitter 340. In the disclosed embodiment, a 1×16 optical splitter 340 is used. Those skilled in the art will understand that optical splitters of other sizes may be used to perform the same function, and are equivalent to the 1×16 splitter. The remaining main fibers 325 in the main buffer tube 310 pass on through to the next splitter location.

Figure 3C:
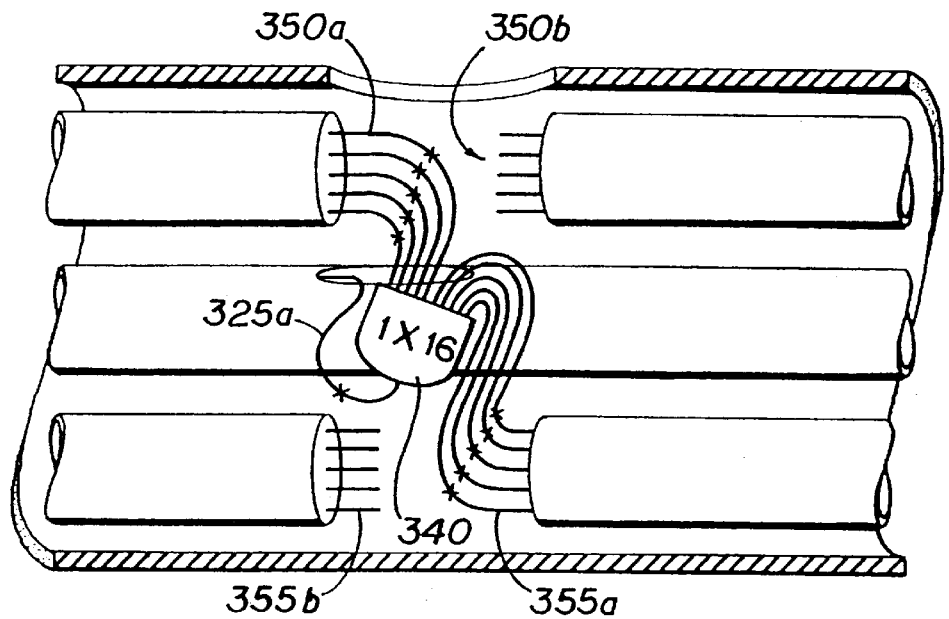

In the next step of the disclosed embodiment, the distribution buffer tubes 315*a*, 315*b*, as well as the distribution fibers 330 within, are completely severed. In the disclosed procedure, two distribution buffer tubes 315*a*, 315*b* are severed, corresponding to an upstream buffer tube 315*a* and a downstream buffer tube 315*b*. The selection of two distribution buffer tubes is not a critical aspect of the disclosed embodiment, and a different number of buffer tubes can be accessed if desired. For instance, if all the distribution fibers 330 for each optical splitter 340 reside in the same distribution buffer tube 315*a*, then only one distribution tube 315*a* may be severed. Severing the distribution fibers 330 results in four sets of fiber ends proximate to the spliced optical splitter 340: upstream fiber ends 350*a*, 350*b* and downstream fiber ends 355*a*, 355*b*. Turning now to FIG. 3C, the appropriate fiber ends are fusion spliced to the outputs of the optical splitter 340. In the exemplary embodiment, eight upstream fiber ends 350*a* and eight downstream fiber ends 355*a* are spliced to the 1×16 optical splitter 340. The unspliced upstream fiber ends 350*b* are the terminal ends of the upstream distribution fibers spliced to the next adjacent downstream optical splitter. Likewise, the downstream fiber ends 355*b* are the terminal ends of the downstream distribution fibers spliced to the next adjacent upstream optical splitter.

Figure 3D:
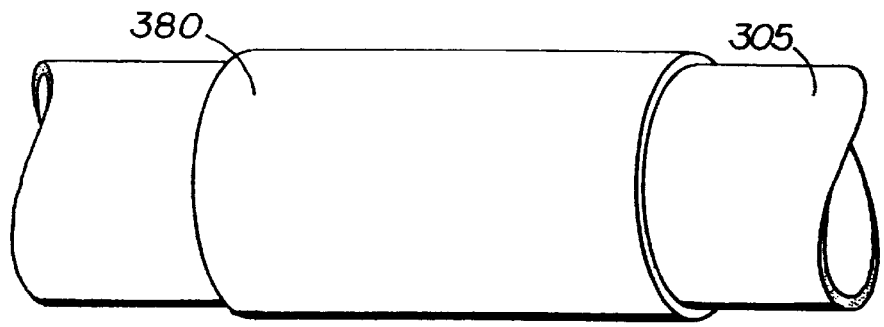

Turning finally to FIG. 3D, once the main fiber 325*a* (FIG. 3C) and the distribution fiber ends 350*a*, 355*a* (FIG. 3C) have been spliced to the optical splitter 340 (FIG. 3C), the outer sheath 305 is resealed. Those skilled in the art will understand that the outer sheath 305 may be resealed in any conventional manner, such as placing a splice case 350 and weatherproof cable connectors. In this manner, a fiber cable having remote splitters is fabricated which provides the ability to penetrate the fiber cable 100 outer sheath 305 at substantially any location along its length, and extract a distribution fiber 330. That distribution fiber 330 can then be spliced to a drop fiber to service a subscriber.

Figure 4:
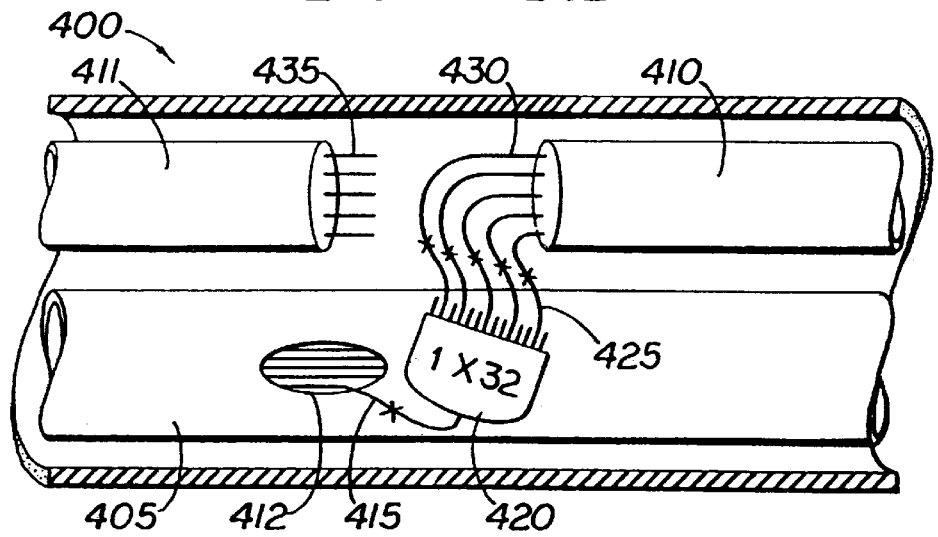
FIG. 4 is an illustration of a length of fiber optic cable in accordance with an alternative embodiment of the present invention.

FIG. 4 illustrates an alternative embodiment of a fiber optic cable 400 according to the present invention. The fiber cable 400 contains main buffer tube 405, distribution buffer tube 410, and distribution buffer tube 411. An access slot 412 provides access to the main fibers resident within the main buffer tube 405. A main fiber 415 protrudes from access slot 412 and is fusion spliced, in a conventional manner, to a 1×32 optical splitter 420.

Distribution fibers 430 are resident within distribution buffer tube 410. The outputs 425 of the optical splitter 420 are fusion spliced to the ends of the distribution fibers 430 protruding from distribution buffer tube 410. The distribution fibers 430 extend in the downstream direction within the distribution buffer tube 410. In this alternative embodiment, the fiber cable 400 provides a length of fiber cable having 32 distribution fibers 430 accessible from substantially any location along the length of the cable 400. However, each accessible distribution fiber 430 corresponds to a single optical splitter 420. The distribution fibers 435 protruding from distribution buffer tube 411 all emanate from the next upstream optical splitter.

While embodying most advantages discussed above, fiber cable 400 does not allow the field technician to reallocate a particular subscriber to another transmitter as in the previous embodiment. All the distribution fibers 430 are routed in the downstream direction. However, fiber cable 400 does provide access to the entire complement of distribution fibers 430 along substantially the entire length of the fiber cable 400. Moreover, the fiber cable 400 may be constructed in the factory, which enables higher quality splices, and greatly reduces the time and cost associated with installing and maintaining fiber cable, thereby making realizable a more cost efficient FTTH distribution infrastructure.

The disclosed embodiments illustrate only the buffer tubes necessary to enable one of ordinary skill in the art to practice the present invention. Those skilled in the art will appreciate that typical fiber cable consists of multiple buffer tubes carrying a plurality of groups of main fibers. Although the disclosed embodiments are discussed with reference to a single feeder portion and a single distribution portion, it is within the purview of the present invention that a fiber cable can comprise a plurality of feeder portions and a plurality of corresponding distribution portions. Moreover, the discussion of the disclosed embodiments is in no way intended to limit the present invention to a more narrow scope than that defined by the appended claims.

In summary, the present invention provides a cost effective fiber cable which will allow the telecommunications industry to more easily realize a FITH network. Advantageously, the present invention provides a remote-splitter fiber optic cable with pre-fabricated optical splitters, the distribution fibers of each optical splitter being displaced within distribution buffer tubes in such a manner as to provide access to a plurality of distribution fibers at any location along the length of the fiber cable.

Therefore, from the foregoing description of an exemplary embodiment, other embodiments of the present invention will suggest themselves to those skilled in the art and the scope of the present invention is limited only by the claims below and equivalents thereof.

What is claimed is:

1. A fiber-optic telecommunications distribution medium, comprising:
    a length of fiber optic cable including an optical fiber operatively associated with an optical splitter at a certain location; and
    a plurality of subfibers operatively associated with the output of the optical splitter with a first subset of the subfibers extended in an upstream direction within the fiber optic cable, and a second subset of the subfibers displaced in a downstream direction within the fiber optic cable,
    whereby at each point along the entire length of the fiber optic cable, at least one subfiber is accessible to be pulled for splicing to a drop to a subscriber.

2. The fiber-optic telecommunications distribution medium of claim 1, wherein the optical fiber and the plurality of subfibers are operatively associated with the optical splitter prior to the fiber optic cable being installed at a subscriber area.

3. A fiber-optic telecommunications distribution medium, comprising:
    a length of fiber optic cable having an outer sheath, a first inner sheath and a second inner sheath, the first inner sheath and the second inner sheath being longitudinally extended within the outer sheath;
    a main optical fiber longitudinally extended within the first inner sheath the main optical fiber being spliced to an optical splitter at a certain location along the fiber optic cable and having a set of outputs, the splice occurring remote to a subscriber area; and
    a first plurality of subfibers optically coupled to a first subset of outputs from the optical splitter, the first plurality of subfibers being longitudinally extended within the second inner sheath,
    whereby at each point along the entire length of the fiber optic cable, at least one subfiber is accessible to be pulled for splicing to a drop to a subscriber.

4. The fiber-optic telecommunications distribution medium of claim 3, further comprising:
    a third inner sheath longitudinally extended within the outer sheath;
    the first plurality of subfibers extending in the upstream direction of the fiber optic cable; and
    a second plurality of subfibers optically coupled to a second subset of the outputs from the optical splitter, the second plurality of subfibers being longitudinally extended within the third inner sheath and extending in the downstream direction of the fiber optic cable,
    whereby at each point along the length of the fiber optic telecommunications distribution medium upstream of the optical splitter, at least one subfiber from the first plurality of subfibers is accessible, and
    at each point along the length of the fiber optic telecommunications distribution medium downstream of the optical splitter at least one subfiber from the second plurality of subfibers is accessible.

5. The fiber-optic telecommunications distribution medium of claim 4, wherein:
    the second subset of outputs from the optical splitter is the entire set of outputs from the optical splitter less the first subset of outputs from the optical splitter.

6. The fiber-optic telecommunications distribution medium of claim 5, wherein:
    the first subset of outputs and the second subset of outputs from the optical splitter each comprise half of the outputs from the optical splitter.

7. A fiber-optic telecommunications distribution medium having an outer sheath, comprising:
    a feeder portion, including a feeder fiber, contained within the outer sheath and extending longitudinally from an upstream end of the fiber-optic telecommunications distribution medium to a terminal end of the feeder portion;
    a distribution portion including a plurality of distribution fibers, the distribution portion being contained within the outer sheath and extending longitudinally a predetermined distance; and
    an optical coupler for optically coupling the feeder portion to the distribution portion, said optical coupling being contained within the outer sheath, an input of the optical coupler being operatively associated with the terminal end of the feeder portion and an output of the optical coupler being operatively associated with the distribution portion,
    whereby at each point along the entire length of the fiber-optic telecommunications distribution medium, at least one distribution fiber is accessible to be pulled from the distribution portion for splicing to a drop to a subscriber.

8. The fiber-optic telecommunications distribution medium of claim 7, wherein:

a first subset of the plurality of distribution fibers and a second subset of the plurality of distribution fibers extend in mutually opposed directions within the outer sheath of the fiber-optic telecommunications distribution medium.

9. A method of manufacturing a fiber-optic telecommunications distribution medium, comprising the steps of:

forming a fiber cable having an outer sheath and a plurality of inner sheaths, each inner sheath having a plurality of optical fibers;

accessing a first inner sheath and splicing an optical splitter to an optical fiber in the first inner sheath, the optical splitter having outputs;

accessing a second inner sheath and splicing an optical fiber in the second inner sheath to an output of the optical splitter; and performing the aforementioned steps prior to installing the distribution medium at a subscriber area.

10. The method of claim 9, further comprising the step of:

accessing a third inner sheath of the fiber cable and splicing an optical fiber within the third inner sheath to another output of the optical splitter such that the optical fiber in the second inner sheath and the optical fiber in the third inner sheath are displaced in mutually opposed directions along the length of the cable.

* * * * *